United States Patent [19]
Markgraf et al.

[11] Patent Number: 5,084,610
[45] Date of Patent: Jan. 28, 1992

[54] ALIGNMENT AND TRANSPORT ROLL MADE OF FLEXIBLE MATERIAL

[75] Inventors: Hans-Georg Markgraf, Gaufelden-Nebringen; Josef Moll, Gaertringen; Klaus Schroth, Altdorf, all of Fed. Rep. of Germany

[73] Assignee: International Business Machines Corporation, Armonk, N.Y.

[21] Appl. No.: 478,890

[22] Filed: Feb. 12, 1990

[30] Foreign Application Priority Data

Apr. 4, 1989 [EP] European Pat. Off. ........ 89103834.1

[51] Int. Cl.⁵ .................. G06K 13/00; G06K 13/063; G06K 13/067; G06K 13/24
[52] U.S. Cl. .................................. 235/485; 235/475; 235/482; 235/483; 235/449; 271/250
[58] Field of Search ............... 235/475, 482, 483, 485, 235/449; 360/2; 266/15, 18, 190; 271/250, 251; 226/15

[56] References Cited

U.S. PATENT DOCUMENTS

| | | | |
|---|---|---|---|
| 2,165,161 | 7/1939 | Spiess | 271/251 |
| 3,560,717 | 2/1971 | Patterson | 235/475 |
| 3,840,223 | 10/1974 | Nakata | 235/475 |
| 3,907,276 | 9/1975 | Gerbasi | 271/251 |
| 3,929,327 | 12/1975 | Olson | 271/250 |
| 3,942,788 | 3/1976 | Boyle | 271/250 |
| 4,775,142 | 10/1988 | Silverberg | 271/251 |

FOREIGN PATENT DOCUMENTS

0085457 10/1988 European Pat. Off. .

OTHER PUBLICATIONS

IBM Technical Disclosure Bulletin, vol. 13, No. 1, Jun. 1970, pp. 217-218.
IBM Technical Disclosure Bulletin, vol. 17, No. 7, Dec. 1974, pp. 2091-2092.

*Primary Examiner*—Stuart S. Levy
*Assistant Examiner*—Christopher R. Glembocki
*Attorney, Agent, or Firm*—John Robert Hanway

[57] ABSTRACT

An alignment and transport roll made of flexible material has a curved cross section and comprises a ring like thicker outer circumferential part. The outer part of the roll 1 is deflected in an alignment direction, by a variable thickness item to be transported such as a passbook. Upon rotation of the roll or movement of the paper, the item is aligned and transported. The alignment force is generated in the same direction regardless of the direction of movement of the item. Such a roll can also be provided with a supporting structure on one side to avoid alignment in the wrong direction when the roll flips over as happens when the roll is deflected in the wrong direction. The roll and supporting structure, or roll along can be joined in a pair of rollers coacting with each other. A roll or roller pair can be used in any alignment unit. The preferable use is in a passbook printer to align the passbook for printing purposes and for reading the magnetic stripe on the passbook. The roll is versatile enough to cope with thinner and thicker material. It also can be used for aligning and transporting continuous forms. Castable plastic material, like polyurethane with a hardness of 60 Share A, may be used as the flexible material for forming the roll.

18 Claims, 6 Drawing Sheets

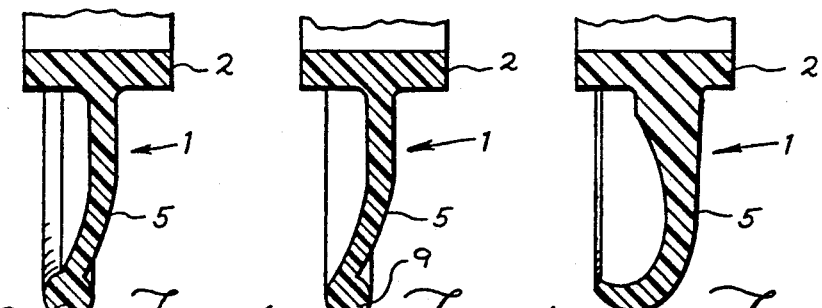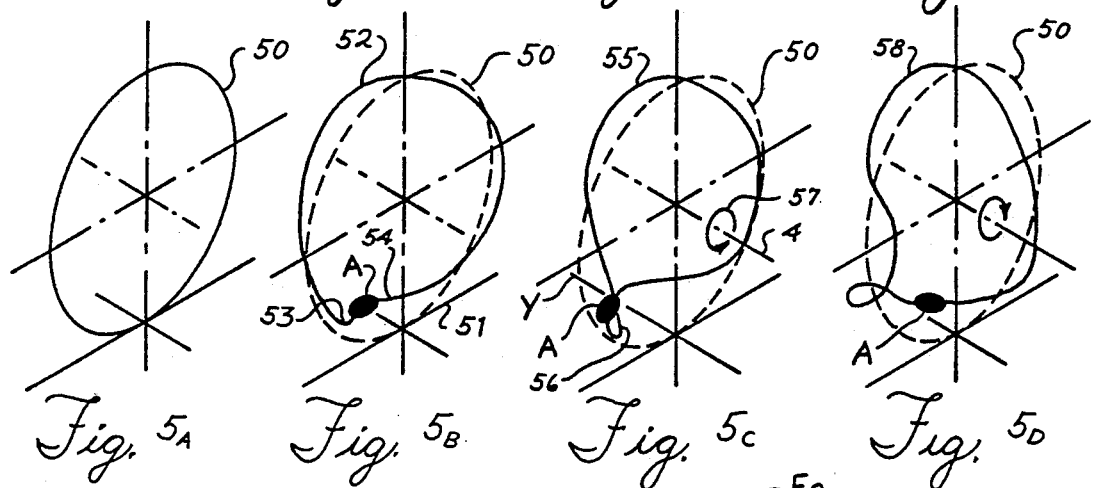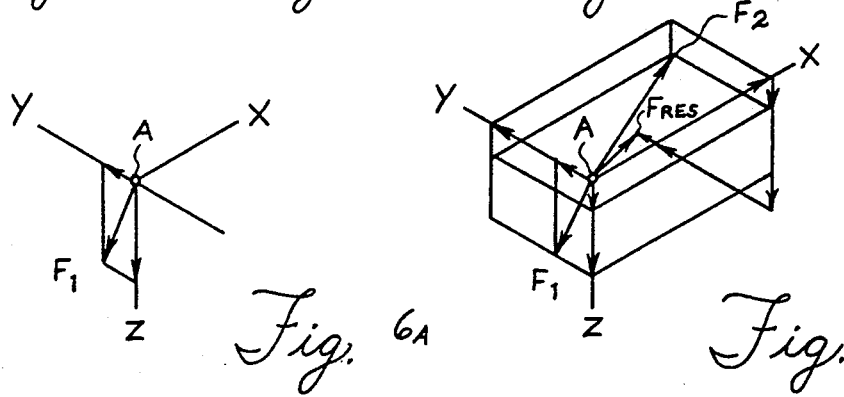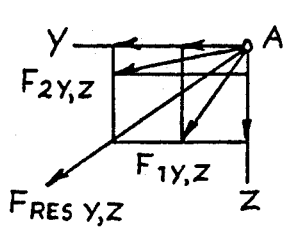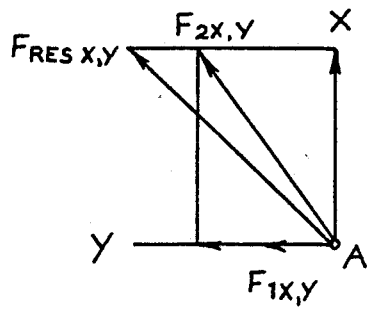

ALIGNMENT AND TRANSPORT ROLL MADE OF FLEXIBLE MATERIAL

FIELD OF THE INVENTION

The invention relates to an alignment and transport roll made of flexible material for use in machines that read documents such as banking machines.

DESCRIPTION OF RELATED ART

A transport and alignment roll made of somewhat flexible material is shown in IBM Technical Disclosure Bulletin. Vol. 13, No. 1, June 1970, pp 217-218, for transporting documents having a magnetic stripe on it. Seen from the side, the roll is provided with fingers. As a card is being driven these fingers are deflected inward for creating a driving force and an aligning force to register the card against the registration surface. Thus the card is registered and transported toward a reading head. These fingers serve also to lift the trailing edge of the card to the other side for reversing the transport direction of the card without changing the turn direction of the roll. That means that the card is inserted by being clamped between a card guide on one side of the two rolls and being transported out of the card reader by being clamped between the other side of the rolls and a second card guide.

To align a document like a piece of paper against a side registration guide, tilted aligning rolls are used which first align the document against a side registration surface. The piece of paper is transported by other transport means that act in parallel with the side aligning surface. If in those cases where the aligning roll is still in contact with a piece of paper it creates a force on the paper and against the aligning surface which may damage the side edge of the transported and aligned piece of paper. If such a creation of force is not tolerable the aligning roll has to be lifted off the transported and aligned piece of paper which means a more complex construction. An example for such a construction is shown in IBM Technical Disclosure Bulletin, Vol. 17, No. 7, Dec. 1974, page 2091-2092.

Shown in U.S. Pat. No. 3,148.877 is a specially designed roll to diminish the force acting on a piece of paper which is sidewise aligned. This roll is divided into sectors by radial slots and made of flexible material. The tilted aligner roll is acting in an angle toward the side aligning surface and after aligning is reached, the sectors in contact with the paper are slightly deflected so that they move in parallel to the aligning surface in direction of transport. Aligning in this construction is performed only in one transport direction. In reverse transport direction no aligning against the registration surface is possible.

SUMMARY OF THE INVENTION

The invention is set forth in the claims, and in an advantageous manner solves the problem of effective aligning and transporting a document while using only one roll. While performing this function, the roll does not damage the edge of an item transported when the aligning is completed and the aligning force is reduced automatically reduced, but is still active, it easily adapts to different thickness of the item to be transported, and it provides a nearly constant pressure area between the item to be transported and the roll so that even with high pressure by the roll on the paper, the paper is not damaged during aligning and transport.

The roll in accordance with the present invention is made of flexible material, has a curved cross section and comprises a ring-like thicker outer circumferential part. In operation, the roll is characterized by the application of alignment force in one and the same direction in which the curvature of the roll points which is also the direction in which the deflection is active, regardless of the transport direction. This assures that an item to be transported, in a forward and backward transport direction, is always aligned against the same side.

Advantageously, the alignment force is applied to the item to be transported by rotating the roll either by drive means acting on the roll itself or moving the roll by the item to be transported in the transport directions.

In accordance with a further development of the invention the thicker outer circumferential part may comprise a circular contour and may have the form of a closed circle of a curved hook. Preferably, a flexible material such as castable polyurethane polyester with a hardness of 60 Shore A is used.

In another embodiment of the invention the roll can be put together with a second roll to form a roller pair which is twice as effective in aligning than one simple roll acting against a fixed item support.

A preferred embodiment of the present invention is the use of the roll in an aligning station of a device for processing items. Those items can be, for example, passbooks that have variable paper thickness. Sometimes there is only one sheet thickness underneath the rollers and sometimes several sheets. For example, the invention is able to cope with a paper thickness between 0.3 mm and 3 mm. In a passbook print unit in which the magnetic stripe provided on the pass book is to be read by a magnetic head, the pass book has to be aligned correctly for reading and writing purposes. Also for an exact printing, precise alignment and transporting of the passbook in the print unit is necessary. This is possible with the application of the present invention.

The roll in accordance with the present invention can also be used advantageously to align and transport continuous forms.

The invention as laid down in the attached claims will be described in more details by the following detailed description. This detailed description shows the invention way of examples and by means of the attached drawings.

BRIEF DESCRIPTION OF THE DRAWINGS

FIGS. 4A, 4B, and 4C show different shapes and points of attachment of the outer circumferential portion of the roll in accordance with the present invention.

FIGS. 5A, 5B, 5C, and 5D are schematic showing different states of roll deformation.

FIGS. 6A, 6B, 6C, and 6D are diagrams showing different states of deformation of the roll with different applied force in connection with FIGS. 5A through 5D.

DETAILED DESCRIPTION OF THE INVENTION

Figure 1:
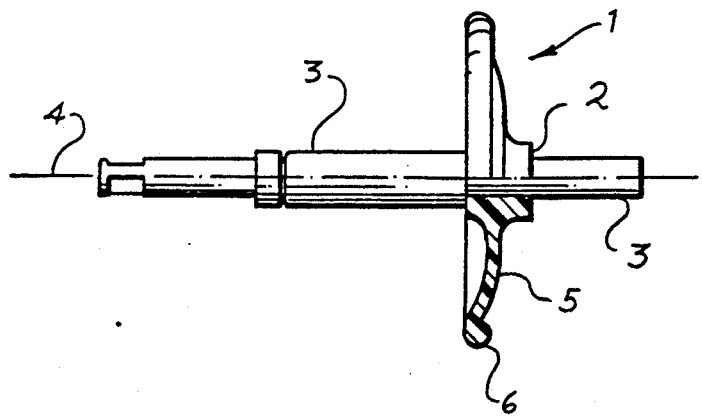
FIG. 1 shows a front view of the roll, partly in cross section.

Shown in FIG. 1, is the front view of the alignment and transport roll 1. Roll 1 with its hub 2 is fixed on a shaft 3 which rotates about revolution axis 4. Fixed to hub 2 is a connecting structure 5 that connects hub 2 with an outer ring like thicker circumferential part 6. As can be seen in FIG. 1, the cross section of roll 1 is curved. That means that the ring like outer circumferential part 6 does not rotate in the same plane as hub 2 or the connecting structure 5 close to the hub. Thus, if force is exerted radially onto the outer circumferential part 6, the latter is deflected eccentrically. The direction of this deflection is usually the one in which the curvature of the cross section points or indicates respectively.

Roll 1 could be made of any flexible material, such as felt, leather, foam, rubber, plastic and the like. The main characteristic of Roll 1, is to transmit the different forces encountered when the outer circumference 6 is distended. Preferably, an elastomere that is capable of being cast is used to form roll 1, which is composed of polyurethane-polyester of 60 Shore A hardness. Using this material provides best results with ease of production, best friction with least wear, and easy deflection and deformation with fast and correct restoring or elastic recovery.

Figure 2:
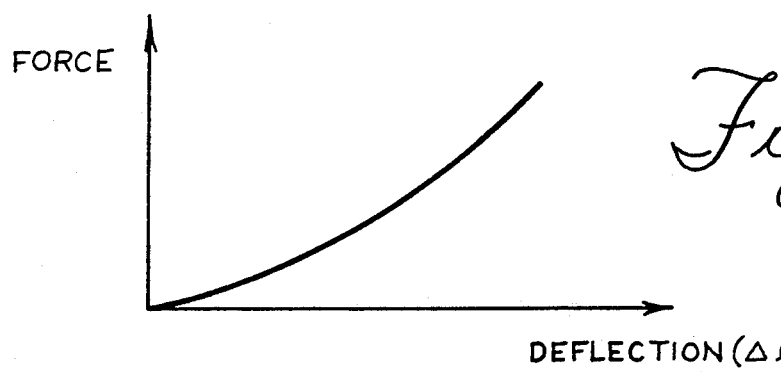
FIG. 2 is a graph showing the force over the deflection.

In FIG. 2 the force in relation to the deflection of roll 1 is shown. The force increases progressively with increasing deflection. This characteristic is very well comparable with the characteristic of a spring. As with a spring the characteristic can be changed in accordance with necessity. As will be shown later, one embodiment encompassing the use of the roll 1 is to align and transport a passbook (not shown) toward a print unit and a reading unit for reading the magnetic stripe provided on the passbook. The passbook has to be properly aligned to print a passbook neatly and to read and write the existing magnetic stripe.

As is well-known, passbooks come in different sizes having various lengths, widths, and thicknesses and may vary in surface finish and rigidity. Additionally, climatic condition factors affect function by causing swelling and contraction of material. Furthermore, the function should be bidirectional with transport in both direction and alignment necessary only in one direction. This means that the alignment and transport roll 1 has to work under a variety of physical transport characteristics and under different environmental conditions while the passbook is being aligned and transported.

Roll 1, can cooperate with many different outer supports, which clamp and align the item to be transported. The outer supports could be a fixed surface, rolls or bearings, or there could be a driven support roll as support or counteracting part. The most effective is a driven roll (not shown) cooperating with the roll 1.

Figures 3A, 3B:
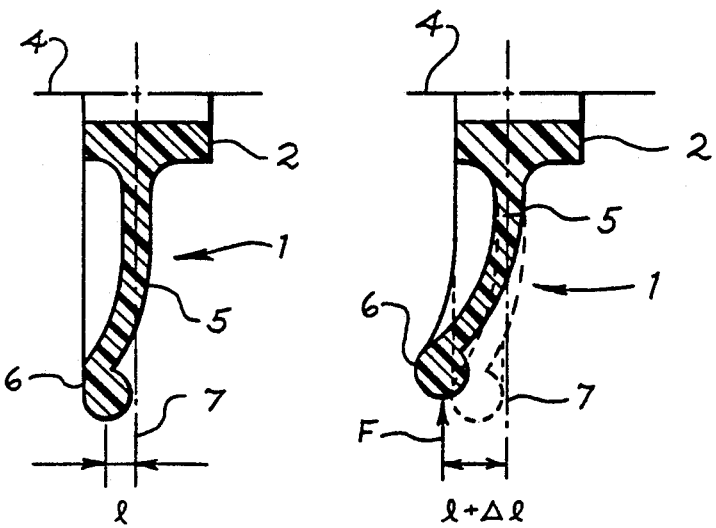
FIGS. 3A and 3B show in cross section the undeflected and the somewhat deflected roll due to eccentric loading of the force.

The deflection function of roll 1 is shown in FIG. 3. It is depicted in FIG. 3A that the ring like outer part 6 is eccentrically displaced by distance 1 from the rotational plane 7 in which hub part 2 and the immediately adjacent part of the connecting structure 5 is rotating. The distance 1 is measured between plane 7 and the lower most part of the ring like outer circumferential part 6. Upon deflection, a force F is acting on the lower most part of the outer circumferential part 6 of roll 1 as shown in FIG. 3B. Thus, as shown by the solid representation of the deflected roll 1, the lower most part is pushed toward the rotational axis 4 and at the same time to the left, so that there is an increased eccentric deflection 1+delta 1 between the application point of force F and the rotational plane 7. In dashed line the undeflected representation of roll 1 is also shown in FIG. 3B.

If roll 1 is compressed in a specified manner, it deflects to the left as shown in FIG. 3B. The eccentric loading of the force F ensures this defined direction of motion of roll 1. If no force is acting on roll 1, then it has the configuration as shown on FIG. 3A.

The aligning force of roll 1 always acts in the direction in which curvature of roll 1 points and the deflection is increased when eccentric force F is loaded. That loading means that at the loading point the radius of roll 1 is diminished. The aligning force is applied to the item to be transported by roll 1 and is always applied in the same direction regardless if the item itself is externally transported and is in contact with roll 1 or if roll 1 itself is turned.

The ring like thicker outer circumferential part 6, of roll 1, which can be considered to have the form of a doughnut shaped ring, comprises a circular contour opposite the item to be transported. This is shown in all Figures showing that part and especially it is shown in FIG. 4A to FIG. 4C. Preferably the outer contour has a diameter of twice the radius of the contacting area which is larger than the thickness of the connecting structure 5. The cross section of the thicker outer circumferential part 6 could be a circle like in FIG. 4A attached more or less symmetrically to the lower part of structure 5 or could be a circle attached more to the right of structure 5 as shown in FIG. 4B, or it could be a curved hook 10 as shown in FIG. 4C. The form shown in FIG. 4C is in principle configuration, because there is no flipping over when the item to be transported reaches the aligning surface as is explained later on. Therefore no additional limitation or supporting structure is required to achieve a large variation in thickness of items to be transported.

The contact area, that is the lower part of outer part 6, or otherwise described as the outer most part of roll 1, has an equally curved area that is in contact with the item to be transported, for example a passbook, independent of the degree of deflection. That means that the contact area between the item to be transported and the roll 1 is more or less constant regardless of the thickness of the item to be transported as is the force value and the intensity of the deflection. By this means a relatively large area of roll 1 is always in a contact with the item to be transported, which mostly is paper, and that the latter is not damaged by sharp edges or small contact areas generating a high pressure area of a roll in operation.

In FIGS. 5 and 6, the operation of roll 1 will be explained in more detail. In FIG. 5 there is a depiction of the track of travel of an outside radius point of roll 1. FIG. 5A shows the unloaded roll, FIG. 5B shows the eccentric force applied in a stationary state showing the initial stress, and FIG. 5C shows the initial stress and the rotation. FIG. 6 shows the force diagrams from different angles.

For better understanding, FIG. 5A shows the circumference of the outside radius of the unloaded roll 1, as a solid line in perspective view. This circumference is also shown in FIG. 5B and 5C in broken lines for better comparison with the form of the outside radius of roll 1. FIG. 5B shows in dashed line 50 the undeformed outside of roll 1 and with the solid line 52 the deformed outer roll 1 track. The contact area, A, between the roll 1 and underneath lying medium, is depicted. This is the point of application between roll 1 and medium. This contact area A is formed from line 51 and both roll areas 53 and 54 resulting in contact area A, being symmetrically deflected to the left from line 51 toward the aligning surface, not shown. This direction corresponds with direction y in FIG. 6.

FIG. 5C shows the roll deformation after the initial stress has been loaded and rotation has been started in direction of arrow 57 around rotational axis 4. The outer circumference of roll 1 has a contour as depicted by a solid line 55. A portion 56 of that outer circumference is tilted toward the aligning surface (not shown) in the contact area A. In the region of the point of contact A, between the roll 1 and the medium, the roll 1 is no longer symmetrical. The circumference 56 points in direction y toward the aligning surface. If the direction of rotation around rotational axis 4 is reversed as shown in FIG. 5D, then the circumference 58 also points in direction y. That means that there is always a component of force in the direction y so that the direction of alignment is not changed when the direction of rotation of roll 1 is changed. The flexible behavior of roll 1 is such that it provides advantageous operation of the roll.

FIG. 6A shows three axis originating in the contact area A, defined as a point for the application of force, with the x axis the direction in which the transport of a medium is performed, the y axis the direction in which aligning is performed and the z axis the direction in which force is applied vertically to the medium. There is applied a force $F_1$ having a component in the y and z direction. This configuration corresponds to FIG. 5B, which depicts the initial stress position without rotation of the roll 1. Upon rotation around axis 4 a second force $F_2$ is applied resulting from the momentum as shown in FIG. 6B. This force $F_2$ has a component in x direction for propelling the medium, and in y direction for aligning the medium and also in z direction for implying pressure to the medium. Force $F_2$ is superimposed to the initial stress force $F_1$, so that there results a resulting force $F_{res}$. The representation in FIG. 6B is made in an isometric view.

For a better overview, FIG. 6C and FIG. 6D show the different components. In FIG. 6C, when x=0, it means that the roll 1 is locked in the transport direction, and in FIG. 6D, when y=0, it means that the roll 1 is locked onto the point of force application A. FIG. 6C shows two components in y direction stemming from the force $F_{2\,y,z}$ and $F_{1\,y,z}$, as well as two components in the z direction, stemming from $F_{1\,y,z}$ and $F_{2\,y,z}$. Both are superimposed on the resulting force $F_{res\,y,z}$. The same is true in FIG. 6D for the two components in the y direction stemming from $F_{1\,x,y}$ and $F_{2\,x,y}$ and in transport direction x from $F_{2\,x,y}$. This is superimposed with a resulting force $F_{res\,x,y}$ pointing in a diagonal direction from point of application A in an aligning and transporting direction. The three dimensional force vector $F_{res}$ is shown in the isometric representation in FIG. 6B.

Figure 7:
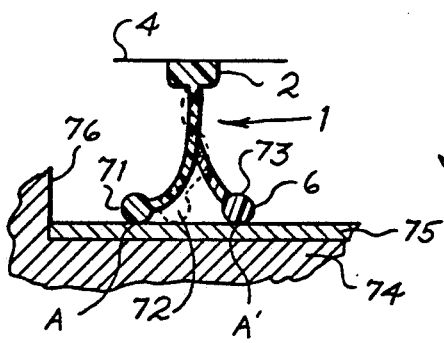
FIG. 7 shows different states of deformation of the alignment roll.

If the forces shown in FIG. 6B, exceed their opposed frictional forces, the passbook, as the medium to be transported moves toward the aligning surface 76 shown in FIG. 7 and along it in the transport direction. When the passbook meets the aligning surface and starts to begin to be transported along the aligning surface in the transport direction, then the forces shown in FIG. 6D let the point of application A travel in a direction opposite to the aligning direction. That means point A travels away from the aligning surface. The forces in the transport direction are not changed thereby. Therefore, the roll 1 is deformed as shown in FIG. 7. The forces perpendicular to the transport direction are balanced when the point of application A is no longer moving vertically to the aligning surface.

The different states of deflection of point of application A is shown schematically in FIG. 7. An item to be transported 75, i.e. a passbook, is clamped between ring like thicker outer part of roll 1 and its point of application A and a support 74. On the left hand side in FIG. 7 there is shown the side aligning surface 76. With the roll 1, in the deflected position 71, the passbook 75 is moved to the side aligning surface 76. An intermediate roll deflected Position 72, shown in dashed line, shows the deflected roll 1 during travelling stage from position 71 to position 73. Position 73 shows deflected roll in equilibrium of forces after aligning is reached and further transport is going on, maintaining the aligning during transport at that stage. Thus, after reaching the aligning surface 76 by item 75 the application point A of roll 1 travels from position 71 to position 73 during further transportation to the application point A and then remains in position 73 during further transportation.

It should be noted in connection with FIG. 7, that the thicker outer circumferential part 6 presents a contact area around and including the point of application A essentially in the form of an ellipse, when viewed in cross section, which independent of the deflection has more or less constant size. This is due to the circle like contour of the outer circumferential shape of the thicker part 6. As can be seen in FIG. 3B–3D, item 75 is always contacted by an ellipse formed of the deflected and compressed outer part 6 of roll 1. Thus, in addition to avoiding destruction of item 75 by sharp edges there is always provided the best application of power in each state of motion.

Figure 8A:
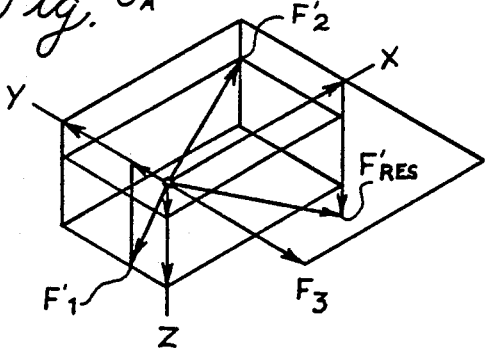
FIGS. 8A, 8B, and 8C show different force diagrams associated with the different states of deformation shown in FIG. 7.

In connection with FIG. 8, the force ratios of the different positional states shown in FIG. 7 will be described. FIG. 8A shows in an isometric representation the different force vectors. They are similar to those of FIG. 6B. The origin of the coordinate system is now the point of application A' as shown in FIG. 7 which corresponds to the position 73 with x the force in the transport direction, with y the force in the direction toward the aligning surface 76 and with z the force in the direction vertically to the support surface 74. $F_1$ is the initial stress after reversal of roll 1. $F_2$ is the force resulting from the momentum turning roll 1 around rotational axis 4 in the transport direction. $F_3$ is the force against the aligning surface 76. $F_{res}$ is the resulting force, composed of the three force vectors $F_1+F_2+F_3$.

Figure 8C:
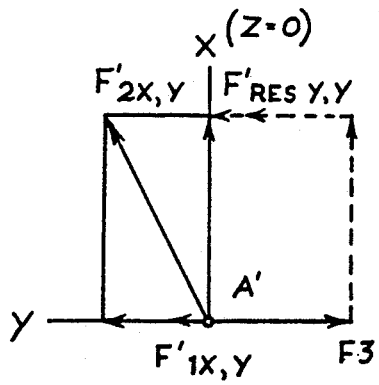
Figure 8B:
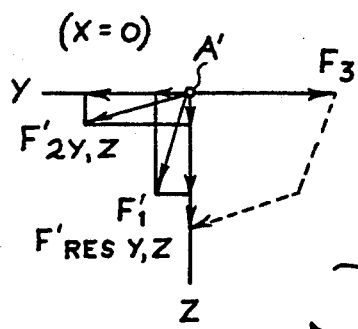

Shown in FIG. 8B are the force components acting in y and z direction when $x=0$, indicating movement to the transport direction. FIG. 8C shows the force components in the x and y directions, as seen from above roll 1 when $z=0$. Interpreting both FIGS. 8B and 8C, the force $F_3$ points in the opposite direction as the aligning direction away from the aligning surface 76. The lesser the amount of deflection of roll 1, the greater the initial stress, as indicated by the force vector $F_1$ and increase as the force vector approaches the z axis, shown as the perpendicular line. When a certain point is passed, the resultant force $F_{res}$ points to the right of the z axis, and the point A shown, in FIG. 8, which is in contact with the item to be transported 75, is transported in the opposite direction, away from aligning surface 76. This flipping over of roll 1 is not desired.

Figure 9:
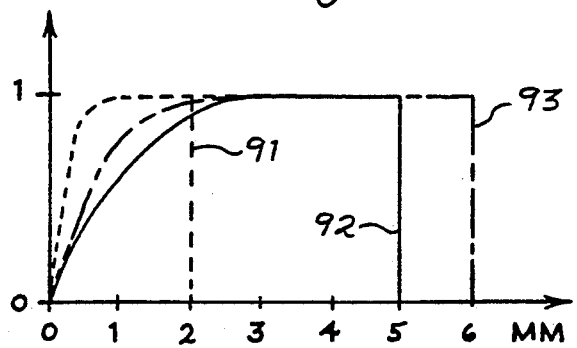
FIG. 9 is a schematic of the alignment rolls working ranges and possible variations.

The vector diagrams of FIG. 8 define the working scope for the roll 1 in accordance with the present invention. The factors defining the working scope are the medium thickness and the path of alignment to transport an item and simultaneously aligned it, against the side aligning surface. In FIG. 9, alignment is depicted as a function of thickness. Curve 91, shown in broken lines, shows a steep increase in aligning force for very thin items and a peak of the aligning function at a medium thickness of 2 mm. Curve 92, shown in solid lines, shows a wider range up to a medium thickness of 5 mm and has a rather flat increase in aligning function with thinner items to be transported. The third curve 93 depicted in dash-dotted lines shows a still wider working scope up to 6 mm thickness. The three different working scopes shown in FIG. 9, are dependent on the various parameters of the aligning roll 1.

Figure 10:
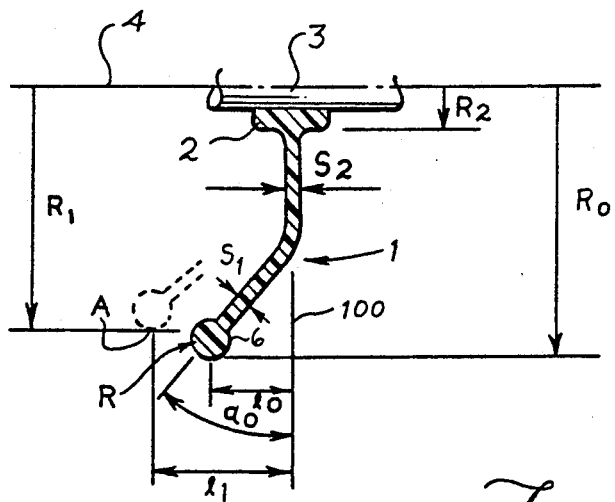
FIG. 10 shows the variation of the parameters of the alignment roll.

In connection with FIG. 10, parameters and dimensions are depicted which contribute to the various possibilities for changing parameters of the roll. Those variable parameters are $R_0$, the radius of roll 1 in unloaded stage:

$R_1$, the active radius of roll 1, which is the distance between the deflected roll after initial stress and the rotational axis 4;

$l_0$, the eccentricity of roll 1, which means, how far point A of roll 1 and the rotational plane 100 are distanced from each other:

$l_1$, the distance between the rotational plane 100 and the rotational plane of the initially deflected roll corresponding to the radius $R_1$;

$\alpha_0$, the angle before deflection of roll 1;

R, the rolling radius, which means the radius of the outer thicker circumferential part, if configured circle like;

$S_1$, the thickness of the part of roll 1 that is most deformable due to its reversal:

$S_2$, the thickness of that part of roll 1 that is least deformable because of the force ratio after reversal:

$R_2$, the splicing radius for roll strengthening and fastening, that means the radius of the hub part 2 of roll 1;

the elasticity of roll 1 measured in hardness in Shore A, and the friction ratio, the abrasion characteristics, the deformation and the reprogression of the material from which the roll is made.

The aforementioned parameters can be varied to optimize the working scope of a specific roll. Thus, an optimized roll may be designed, depending on the application. As a result, a roll has a relative wide range in coping with different thickness of the item to be transported.

Figure 11:
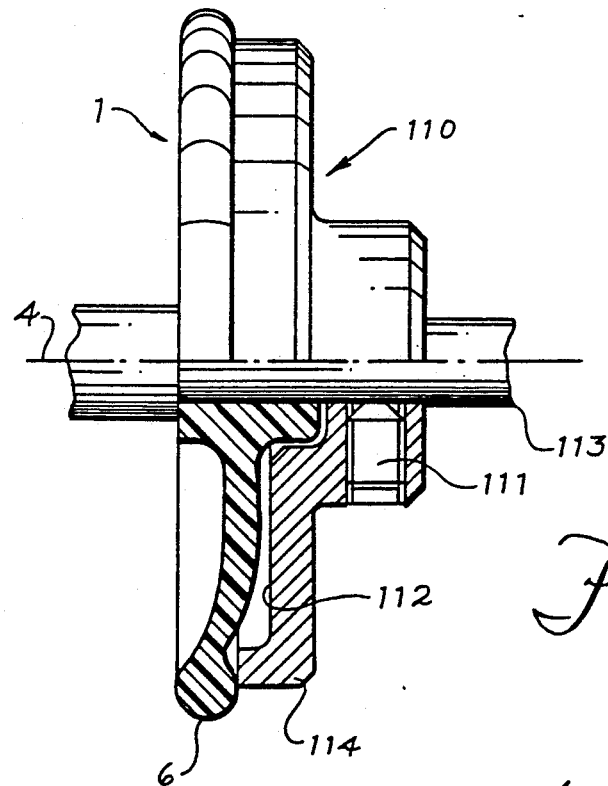
FIG. 11 is a front view of the alignment roll together with a limitation or supporting structure.

As has already been mentioned, in connection with the description of FIG. 7, roll 1 may be flip over into a position where its aligning force acts in a direction opposite to that wanted. To avoid this possibility a further development of the present invention provides a supporting structure 110 that is shown in FIG. 11 in connection with roll 1. The supporting structure 110 is fixed by screw 111 to axis 113 for co-rotation around rotational axis 4 together with roll 1. The diameter of this supporting structure 110 is smaller than the diameter of the unloaded roll 1. As shown in the cross-sectional part of FIG. 11, supporting structure 110 is formed in a cup-like disk with a recessed part 112 and a ring like protruding rim 114. This rim like protrusion 114 is provided on the outside radius. The supporting structure 110 provides a limitation function against the reversal motion of outer part 6 of roll 1 away from the aligning surface. That means that the limitation of supporting structure 110 is provided on that side of roll 1 which is opposite to the aligning surface or opposite to the side to which the roll 1 is curved, respectively. As shown in FIG. 11 outer part 6 rests on rim 114. This construction shown in FIG. 11 is rather strict in its limitation function. In accordance with the different applications there might be provided a gap between roll 1 and supporting structure 110, as for example indicated by the distance $l_g$ in FIG. 12.

Figure 12:
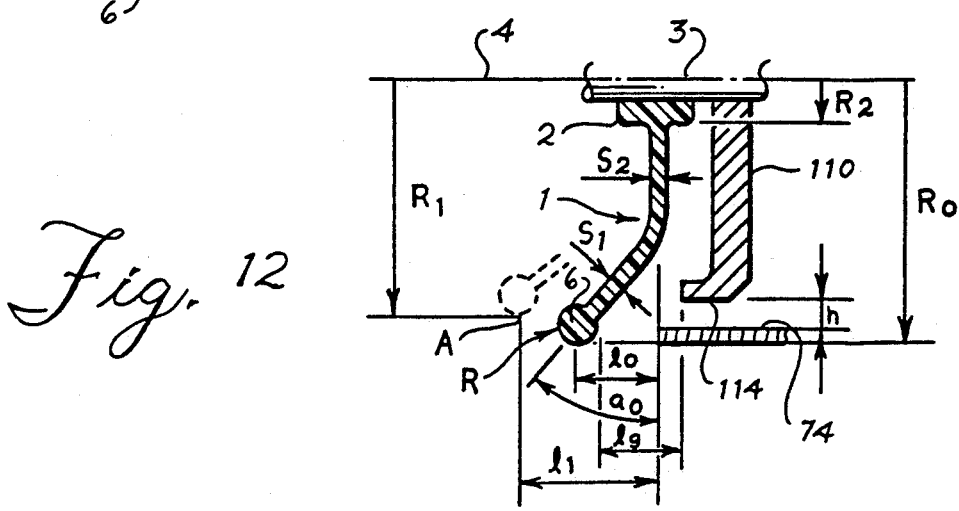
FIG. 12 shows various possibilities for changing the parameters of the alignment roll and the limitation or supporting structure.

FIG. 12 is a similar representation as that of FIG. 10 with the addition, that supporting structure 110 is provided on axis 3 for co-rotation around rotational axis 4. Rim like protruding portion 114 has a distance h between the outer radius of supporting structure 110 and the item support 74. Furthermore, there is a distance $l_g$ indicated between the surface of protruding rimlike portion 114 and the thicker outer circumferential part 6 of roll 1.

Figure 13:
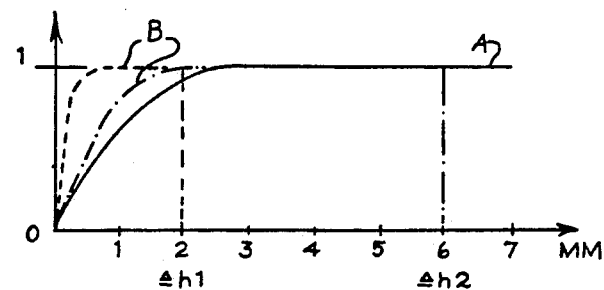
FIG. 13 is a graph the working scope of the aligning roll together, with the limitation or supporting structure.

Dependent on the value for the distance "h" shown in FIG. 12, different working scopes of a roll 1 containing a supporting structure 110 may be defined. Those are shown, for example, in FIG. 13 with 2 mm for $h_1$ and with 6 mm for $h_2$. The curve, defined by point of contact A, show the working scope for automatically adapting the limitation means to various thicknesses. That means that in the example of curve defined by contact point A, the limitation means adapts itself to the different thicknesses of the medium to be transported. Whereas the curves B, are limited in the thickness working scope, by a non variable supporting structure 110, having different values for h and therefore a limited thickness working scope of 2 and 6 mm, respectively as shown in the examples.

Figure 14:
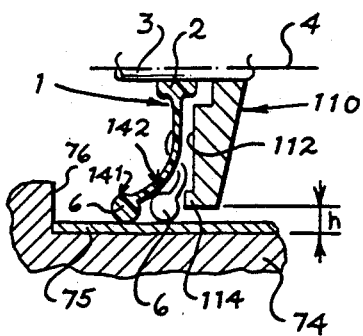
FIG. 14 shows two different states of deflection and deformation of the alignment roll with limitation structure.

The FIG. 14 shows a similar configuration as already shown and described in connection with FIG. 7. The supporting structure 110 which also could be designated as a limitation structure 110 limits the reversal motion of protruding thicker circumferential part 6 when it moves or travels, from position 141 to position 142. It also can be seen that the recess portion 112 receives part of the distended roll 1 when it is in position 142. In that position outer part 6 rests on the protruding rim 114. As can be seen from FIG. 14 the maximum thickness for the item to be transported 75 is limited by the distance between the outer radius of supporting structure 110 and the support 74 which is given by the distance "h". The structure shown in FIG. 14 clearly shows that the supporting structure 110 limits the deflection of outer part 6 away from side aligning guide 76 and thus avoids unwanted change of aligning direction and avoids flipping over of roll 1 into an unwanted state.

The roll 1 in accordance with the present invention and, for example, in the form as shown in FIG. 1 or as shown in FIG. 11, can be coacted with a flat supporting surface on which the medium to be transported rests. It also can coact in pairs, so that two rolls 1, as shown in FIG. 1, are arranged opposite to each other or two rolls 1 as shown for example in FIG. 11 are arranged opposite to each other and coact together.

Figure 15:
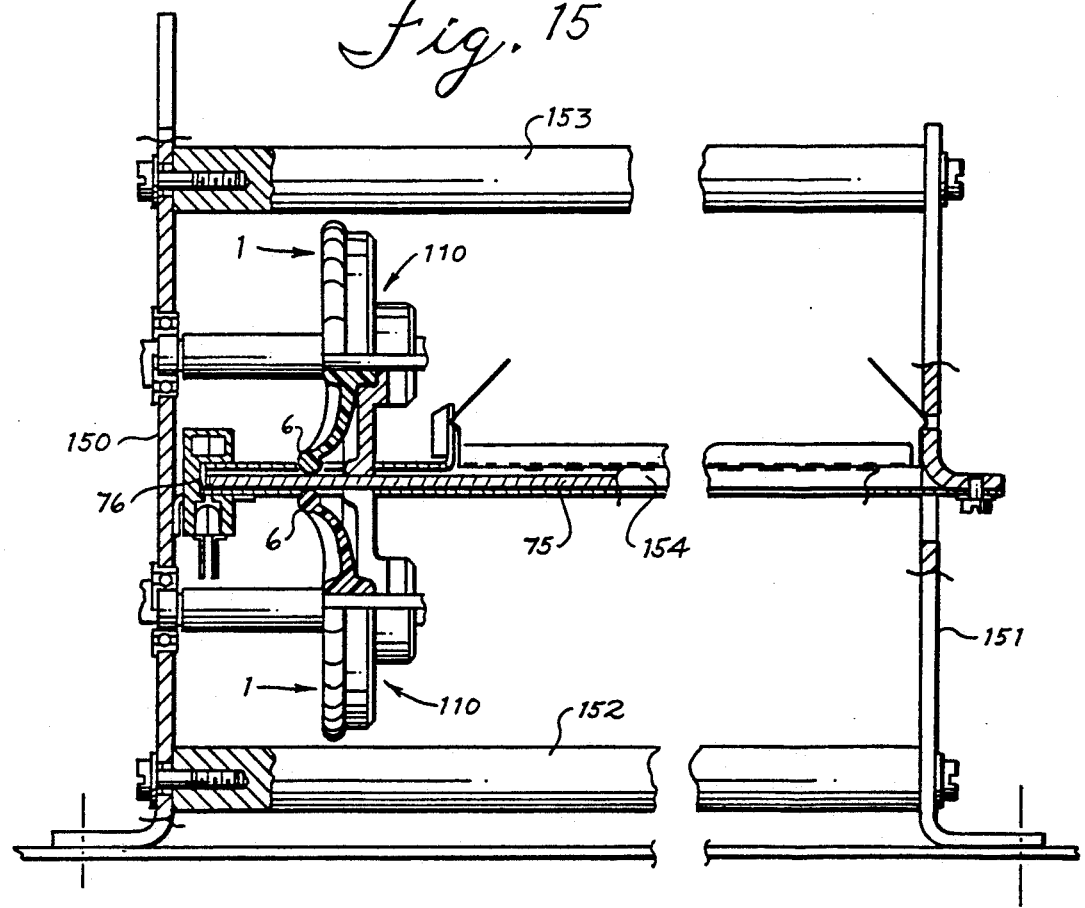
FIG. 15 shows a transport and aligning unit in a passbook printing unit.

An example of a pair of coacting rolls, as shown in FIG. 11, is shown in FIG. 15. There, two rolls 1, each with a limitation or supporting structure 110, are fixed to a side wall 150. A second side wall 151 is provided and connected by rods 152 and 153 to side wall 150. Between the two side walls 150 and 151, an opening 154 is provided into which an item to be transported 75, for example a passbook, can be inserted. The side aligning guide 76 is provided to the left on FIG. 15, to which passbook 75 is. The item 75 transport direction is perpendicular to the plane of the drawing of FIG. 15. The two thicker outer circumferential parts 6, are deflected by the passbook 75 inserted into opening 154. Furthermore, it can be seen, that the thickness of the passbook to be inserted has to be less than the distance between the two outer radius of the two supporting structures 110. In turning the pair of rollers on which the two rolls 1, are mounted, the passbook 75 is transported back and forth, and at the same time, aligned towards the side aligning surface 76.

In FIG. 16, a top view of the roll 1 is shown. The roll 1 is curved to the right, in direction y, towards aligning surface 76, which is only indicated, and not shown. The ring like thicker outer part 6 is shown in different deformation stages.

Figure 16A:
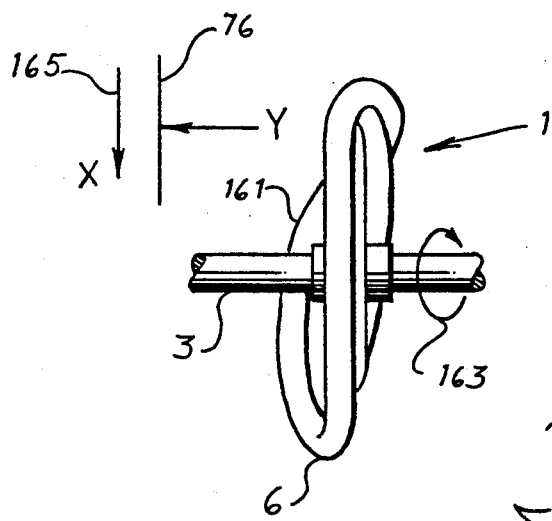
FIGS. 16A and 16B are top views of the roll in two different positions.

In FIG. 16A, axis 3 is turned in the direction of arrow 163. This turning momentum turns part 161 of the ringlike part 6 of roll 1 towards the aligning surface 76, to create a component in the y direction. This part 161 of roll 1 could be thought as an aligning roll that is tilted against the transport direction which in the instance of FIG. 16A is indicated by arrow 165.

Figure 16B:
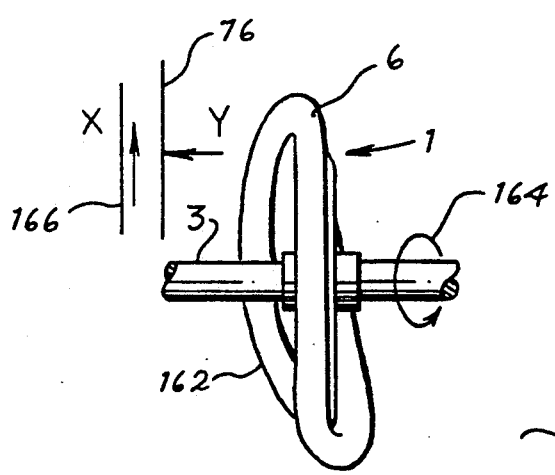

The state of roll 1, shown in FIG. 16B, is opposite, as the transport direction is reversed in accordance with arrow 166' which means that axis 3 is turned in accordance with arrow 164 and part 167 of ringlike thicker outer part 6 is turned opposite to part 161, as shown in FIG. 16A. Also this part 162 could be considered as an aligning roll acting in the direction as indicated by part 162.

The two FIGS. 16A and 16B show clearly how upon mere changing of the turning direction of axis 3 a part of roll 1 automatically turns in an aligning direction. The part turning in an aligning direction is a part which transmits the aligning and transporting force to the medium to be aligned and to be transported.

The roll 1, in accordance with the present invention, in all its variations, provides a wide working scope and a plurality of easily realized parameter changes. That means that high development costs for aligning structures are avoided. Also this design allows the use of simple casting equipment or die molds, which means that more parts at less costs can be generated. No lift or turn mechanisms are necessary for aligning. Aligning is possible in the forward and backward direction. Furthermore, it is easy to install the aligning roll 1, with its axis, 90° to the transport direction. The various medium characteristic can be matched by the design of roll and support parameters.

As can be seen from the forgoing description of the preferred embodiment, the roll adapts automatically to media of different thickness, even within the same media, for satisfactory transport and aligning. The continuous aligning of the medium allows quick transactions since there are no time delays resulting from transport stop, aligning, and again transport. It will be apparent to those skilled the art of fabricating document transports that various changes can be made in the form and arrangement of components of the invention without departing from the spirit and scope of the invention.

We claim:

1. An alignment and transport roll for aligning and transporting a medium along a predetermined path, said roll comprising:
   a hub lying in a first plane and mounted around an axle;
   a flexible outer circumferential portion lying in a second plane and having the form of a continuous, doughnut-shaped ring, said second plane being essentially parallel to said first plane and substantially perpendicular to said predetermined path; and
   a flexible structure having a curved cross-section defining an arc, said flexible structure connecting said hub and said flexible outer circumferential portion together, and said circumferential portion being constructed of a thicker material than said flexible structure.

2. An alignment and transport roll as in claim 1, wherein said outer circumferential portion of said roll is generally circular in cross section.

3. An alignment and transport roll as in claim 1, wherein said outer circumferential portion of said roll is hooked shaped.

4. An alignment and transport roll as in claim 1, wherein said flexible material used for said rolls is polyurethane polyester with a hardness of 60 Shore A.

5. The alignment and transport roll of claim 1 wherein the flexible outer circumferential portion is spaced from the hub by said flexible structure, and said continuous member has a circular shape around the hub when not deformed during aligning or transporting.

6. An alignment and transport mechanism for aligning and transporting a medium, comprising:
   means for mounting components,
   an axle mounted on said component mounting means,
   a first roll, having a hub lying in a first plane, and mounted on said axle a flexible outer circumferential portion lying in a second plane, essentially parallel to said first plane, and a flexible structure having a curved cross-section defining an arc and connecting said hub and said flexible outer circumferential portion,
   means for rotating said first roll about said axle,
   means to transport a medium in a plane essentially perpendicular to said first plane, and a side alignment guide having an alignment surface mounted on said frame, said alignment surface essentially parallel to said first plane and in alignment with said transport means to receive a transported medium, said alignment guide's surface located essentially perpendicular to the arc of said structure having a curved cross-section.

7. An alignment and transport mechanism for aligning and transporting a medium as recited in claim 6, wherein said side alignment guide's surface is comprised of the outer circumference of a second rotatable roll having its plane of rotation perpendicular to said first plane.

8. An alignment and transport mechanism for aligning and transporting a medium as recited in claim 7, wherein said side alignment guide'surface is comprised of multiple flexible rolls.

9. An alignment and transport mechanism for transporting a medium, as in claim 6, wherein said flexible outer circumferential portion of said first roll has the form of a doughnut-shaped ring that is attached to said flexible structure having a curved cross-section connecting said flexible outer circumferential portion and said hub, said flexible thicker outer circumferential portion providing uniform contact area with a medium to be transported.

10. An alignment and transport mechanism as in claim 6, wherein said outer circumferential portion of said first roll as seen in cross-section, has the form of a closed circle.

11. An alignment and transport mechanism for transporting a medium, in claim 6, wherein said flexible outer circumferential portion of said first roll comprises a circular contour, said flexible outer circumferential portion having a radius twice the thickness of the flexible structure having a curved cross-section.

12. An alignment and transport roll as in claim 6, wherein said flexible outer circumferential portion of said first roll as seen in cross section, has the form of a curved hook.

13. An alignment and transport mechanism as in claim 6, wherein on the side of said first roll opposite to the side in which said arc of said curved cross-section is directed, said flexible outer circumferential portion is limited in its range of deflection in the direction of said first plane by limitation means.

14. An alignment and transport mechanism, as in claim 13, wherein said limitation means is a fixed supporting structure.

15. An alignment and transport mechanism as in claim 13, wherein said limitation means further comprises a cup like disc mounted in axial alignment with said hub of said first roll, said cup like disc having a circumferential rim aligned with the outer circumferential portion of said first roll for limiting deflection.

16. An alignment and transport mechanism as in claim 15, wherein said circumferential rim of said cup like disc is in proximity to said first plane.

17. An alignment and transport mechanism as in claim 15, wherein the radius of said circumferential rim is smaller than the radius of said first roll.

18. An alignment and transport mechanism as in claim 6, wherein two first rolls are aligned in the same plane, opposite each other, with essentially parallel axis of rotation, such that they form a cooperating roller pair.

* * * * *